A. B. MUELLER.
PICTURE PROJECTION APPARATUS.
APPLICATION FILED NOV. 7, 1917.
1,317,637. Patented Sept. 30, 1919.
3 SHEETS—SHEET 1.
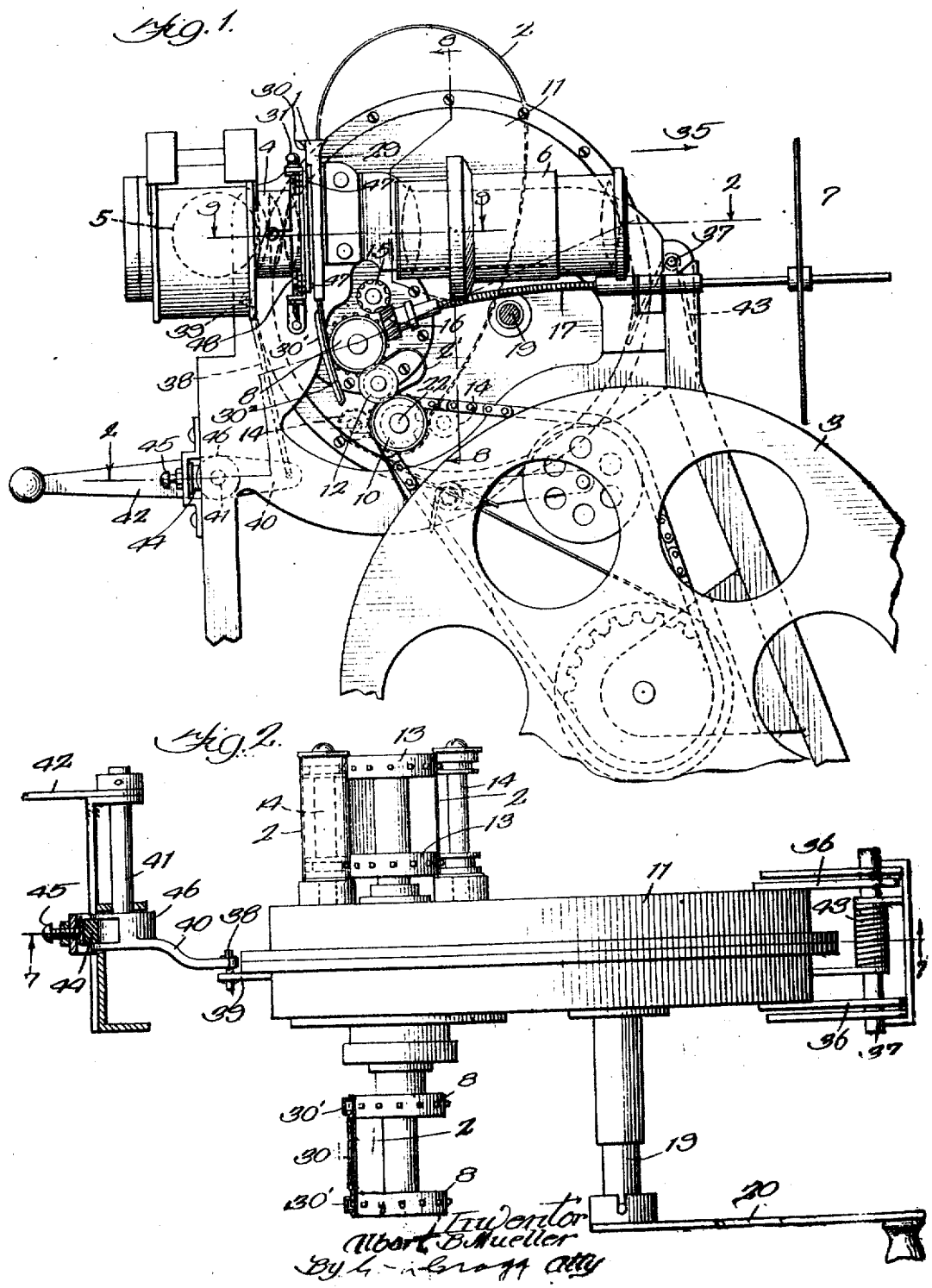

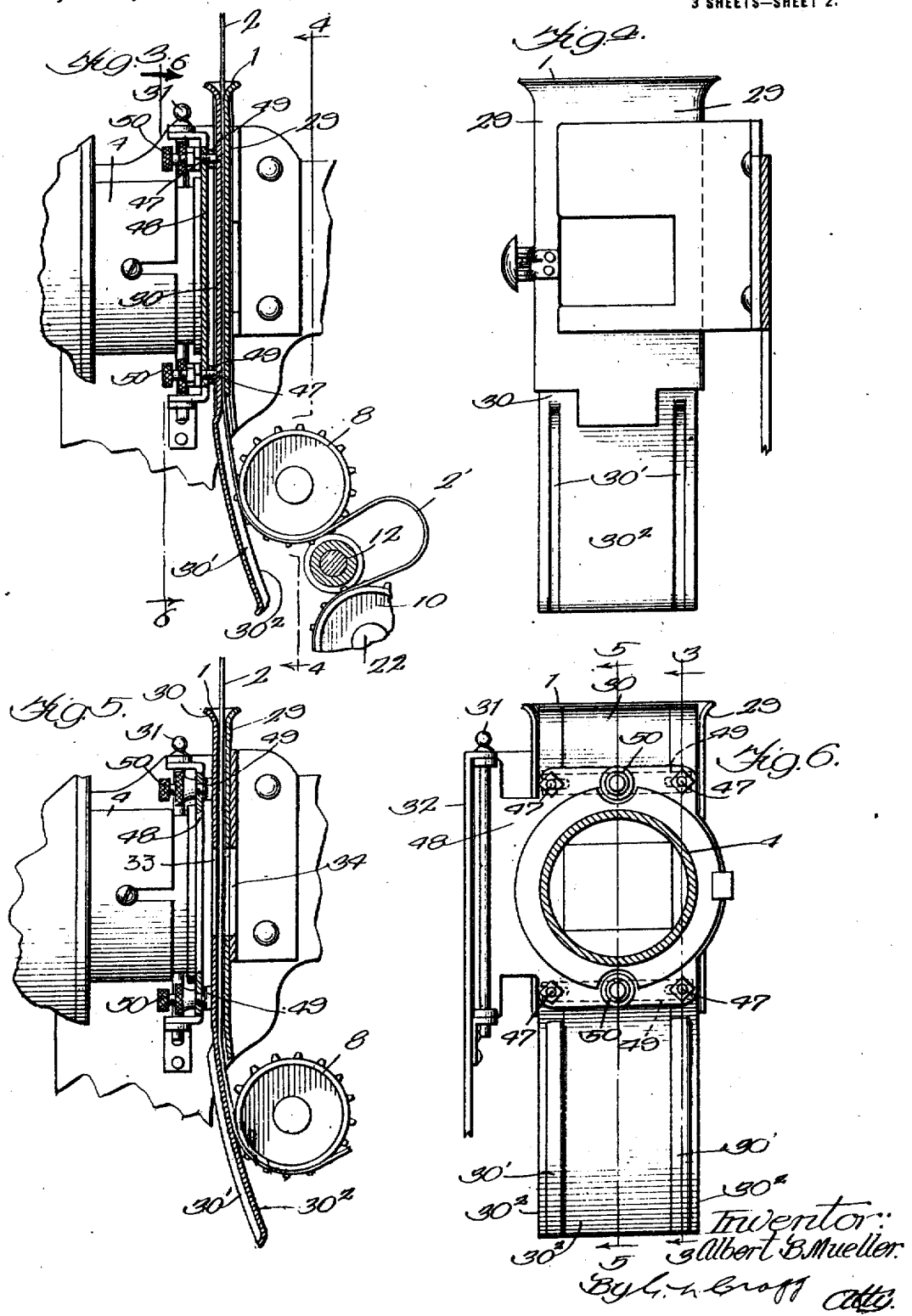

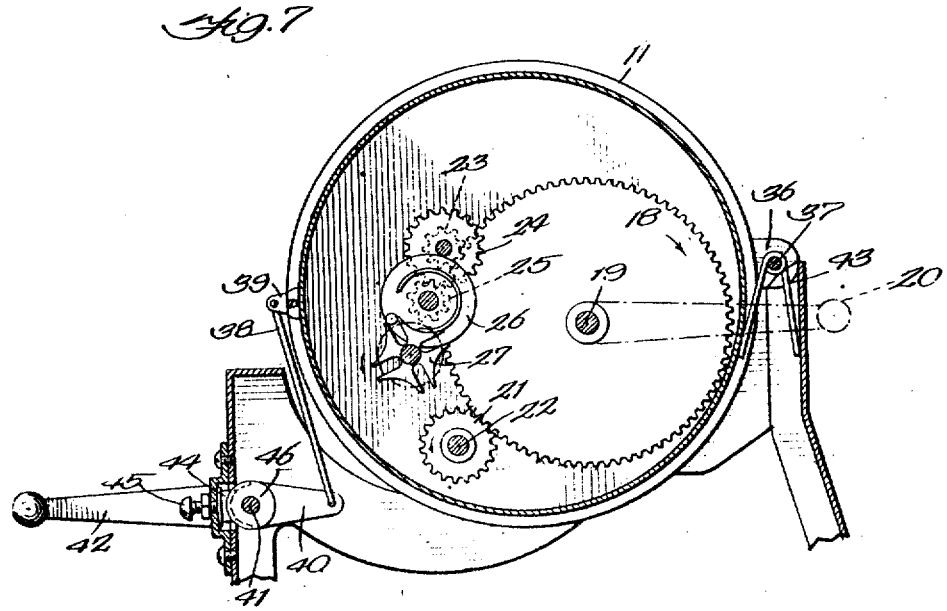

UNITED STATES PATENT OFFICE.

ALBERT B. MUELLER, OF CHICAGO, ILLINOIS.

PICTURE-PROJECTION APPARATUS.

1,317,637.   Specification of Letters Patent.   Patented Sept. 30, 1919.

Application filed November 7, 1917. Serial No. 200,688.

*To all whom it may concern:*

Be it known that I, ALBERT B. MUELLER, a citizen of the United States, residing at Chicago, in the county of Cook and State of Illinois, have invented a certain new and useful Improvement in Picture-Projection Apparatus, of which the following is a full, clear, concise, and exact description.

My invention relates to motion picture projection apparatus employed either in projecting pictures upon screens or in projecting pictures from negatives in the operation of printing upon positives. Apparatus in conjunction with which my invention may be employed to advantage, but to which form of apparatus my invention is not to be limited, includes a guide having openings therein through which picture projecting light is passed and through which guide picture bearing film is passed successively to present pictures to the openings in the guide. The apparatus also includes an intermittently operated pinion structure for effecting step by step movement of the film through the guide, a second pinion structure having continuous rotation for passing the film on from the intermittently operated pinion, and a reel upon which the film is wound as it passes from the second pinion structure. The film is looped between the aforesaid pinion structures in order that the continuously operating pinion structure may feed the film toward the reel at times when the intermittently operated pinion structure is at rest and without regard to the rate at which the intermittently operated pinion structure moves the film toward the continuously operated pinion structure. The film is fed between the other reel and the guide by means of another constantly operating pinion structure.

My present invention has for its general object the provision of mechanism whereby the "framing" may be permitted or accomplished, that is, whereby the pictures may be individually brought into register with the openings in the guide when the film is at rest in the guide. By means of my invention I am enabled to effect the desired "framing" adjustment of the film without unmeshing or disengaging the film from the intermittently operating gearing.

In the preferred embodiment of the invention the movement of the film with respect to the guide for the "framing" adjustment is desirably effected by bodily movement of the intermittent gearing in the line of travel of the film through the guide, the intermittent gearing in such movement causing an adjusting movement of the film that is supplemental and distinct from the feeding movement of the film effected by the rotation of the intermittent gearing. In order that my invention may be practised without making the gearing more complicated, I desirably bodily adjust all of the gearing that takes part in effecting and controlling the travel of the film, a result which is secured by swingingly mounting the gear casing or other gear mounting that incloses some of the gearing and upon whose exterior other parts of the gearing are mounted. My invention permits the so-called framing adjustment of the film not only by movement of the film in its normal direction of travel through the guide but also by a reversal of such movement of the film. That is the adjusting movement of the film for framing purposes may be effected by moving the film up or down in the guide.

I will explain my invention more fully by reference to the accompanying drawings showing the preferred embodiment thereof and in which Figure 1 is a view of the front side of a motion picture projection machine equipped in accordance with my invention; Fig. 2 is a view on line 2—2 of Fig. 1; Fig. 3 is a view on line 3—3 of Fig. 6; Fig. 4 is a view on line 4—4 of Fig. 3; Fig. 5 is a view on line 5—5 of Fig. 6; Fig. 6 is a view on line 6—6 of Fig. 3; Fig. 7 is a view on line 7—7 of Fig. 2; Fig. 8 is a view on line 8—8 of Fig. 1; and Fig. 9 is a view on line 9—9 of Fig. 1.

Like parts are indicated by similar characters of reference throughout the different figures.

The motion picture apparatus illustrated is one which is adapted to the projection of pictures upon a screen and includes a guide 1 through which picture bearing film 2 is fed downwardly from a supply reel, not shown. Upon the rear side of the guide 1 is the condensing lens structure 4. At the rear of this lens structure there is a lamp 5 contained in a suitable housing. In front of the guide 1 there is the projecting lens structure 6 and in front of this projecting lens structure is the shutter 7 that permits and prevents the passage of light to the screen, as is well understood. The film is downwardly fed through the guide by means of an intermittently operated pinion structure 8 which, in this instance, includes two pinions, the teeth upon each being in mesh with the apertures 9 along the two longitudinal edges of the film. I do not wish to be limited however to the inclusion of two pinions in such pinion structure. This pinion structure is turned one step to move each picture from the presence of the condensing lens structure 4 and to substitute a succeeding picture for the removed picture, it requiring, in the construction shown, one revolution of the pinion structure 8 for the successive presentation of four pictures, it taking a quarter of a revolution to replace each picture by a succeeding picture.

The film is passed downwardly on from the pinion structure 8 by the pinion structure 10 that likewise has two pinions but to the employment of which two pinions the invention is not to be limited. The pinion structure 10 is uninterruptedly operated at a constant rate of speed by suitable gearing. The gearing, later more fully to be referred to, for operating the pinion structures 8 and 10 is included in the gear casing 11 commonly known as a head. The film is passed from the pinions 10 to that which is normally the winding reel 3. The film is formed into a loop 2¹ between the pinion structures 8 and 10 in order that the film may leave the pinion structure 8 step by step and may be uninterruptedly passed downwardly on at the pinion structure 10 at a uniform rate of speed.

By means of another invention claimed in my co-pending application Serial No. 200,684, filed November 7, 1917, Case B, the equipment employed for maintaining the film in mesh with the pinion structures is simplified and is preferably inclusive of a single idler roller 12 that enters the loop 2¹ and presses the sides of the loop toward the pinion structures to maintain the film in mesh therewith.

The supply reel, not shown but which is preferably co-axial with the winding reel 3, is normally upon the rear side of the apparatus and is free to be rotated by the film 2 as such film is drawn from said reel. The film is drawn from the supply reel by the pinion or sprocket gear structure that preferably includes two pinions 13 that are in fixed relation and co-axial with each other and with the pinions 10. These pinions 13, during the normal operation of the apparatus, are uninterruptedly rotated at a uniform rate of speed. They are also driven by gearing located within the gear casing 11. Two idler rollers 14 are disposed near the pinion structure 13, this pinion structure being disposed between said rollers whereby the rollers are enabled to engage the film and preserve it in mesh with the teeth of said pinion structure.

The film is looped where the pinions 13 are located and the rollers 14 maintain the bight of this loop in mesh with the pinions. The pinions 13 feed the film upwardly toward the guide 1, sufficient slack intervening between the pinions 13 and said guide to enable the film to be fed downwardly through said guide by the intermittently operating pinion structure 8 without disturbing the engagement of the pinions 13 with the film.

The interrelation of the pinions 13 and idler rollers 14 is set forth and claimed in my co-pending application Serial No. 200,690, filed November 7, 1917, Case H.

The idler rollers 12 and 14 are so related with the pinions adjacent thereto that the film may readily be caused to travel in a reverse or upward direction through the guide 1 as well as in the normal downward direction without readjustment of these rollers and pinions, in which event the supply reel would become the winding reel and the winding reel 3 would become the supply reel.

The gearing for turning the pinions 8, 10 and 13 and the spiral pinion 15 that is in mesh with the spiral pinion 16 that in turn is in driving connection with a flexible shaft 17 that drives the shutter 7, is housed within the gear casing 11 and includes a large spur gear wheel 18 upon the crank shaft 19. This crank shaft has bearings in the sides of the gear casing, one end of the crank shaft being connected with any suitable means for effecting its rotation. In the embodiment of the invention shown an operating crank handle 20 is separably connected with one end of the shaft 19. The spur gear 18 engages the pinion 21 upon whose shaft 22 the constantly running pinions 10 and 13 are fixedly mounted. The gear 18 is in mesh with a pinion 23 upon the same shaft with the pinion 24. The pinion 24 is in mesh with a pinion 25 that is in fixed connection with the cam wheel 26 of a Geneva movement. The star wheel 27 of the Geneva movement is upon the same shaft that carries the intermittently operated pinions 8 that are in mesh with the holes 9 in the film 2. The elements of the Geneva movement are desirably carried by and within the gear casing 11 and by the removal of which the Geneva movement may readily be taken from the gear casing. The gear casing may be oil tight to contain lubricating oil therein for the purpose of lubricating the gearing inclosed by the casing.

The guide 1 is preferably formed of a stationary apron 29 and a swinging apron 30 that has hinged connection at 31 with the frame of the apparatus. The aprons 30 and 29 are provided with registering rectangular openings 33 and 34. The apron 30 carries the condensing lens structure 4 and the lamp structure 5. The pictures upon the film are projected in the direction indicated by the arrow 35. If the projection apparatus is used in printing from a negative film upon a positive film it will be modified to the necessary extent as will be apparent and I therefore use the term "projection" in its broadest sense as being applied to any form of apparatus through which a picture bearing film is progressing whether such film bears positives for the purpose of their projection upon a screen or bears negatives for the purpose of printing positives from such negatives. The film 2 is free of tight engagement with the aprons 29 and 30 whereby the film may readily be moved in either direction between said aprons in framing.

The gear casing has two forwardly extending ears 36 which are journaled upon a rod 37 that is located in front of the gear casing, this rod affording a swinging mounting for such casing. The gear casing 11 is provided with means for turning it upon its mounting 37, which means includes a stiff rod 38 connected at 39 with the gear casing at the upper end of the rod, the lower end of the rod being connected with the lever 40 rigidly secured upon the shaft 41 that is journaled in the frame 32 of the apparatus. The lever handle 42 is in rigid relation with the shaft 41 and is turned in one direction or the other according to the direction in which the gear casing 11 is to be spring upon its mounting 37. A coiled spring 43 engages the frame 32 at one end and a part of the gear casing 11 that is below the rod 37 and serves to have counterbalancing effect to offset the weight of the casing. The function of the spring 43 may be supplemented by the brake block 44 that is adjustably applied by a screw 45 to the hub 46 of the arm 40, this hub being concentric to the shaft 41 to render the engagement of the hub and the brake block uniform. The brake block, operating upon the hub 46, also serves positively to hold the gear casing 11 in any position to which it is swung upon the rod 37. As the film 2 is not in tight engagement with the aprons 29 and 30 the film may be slipped up and down therebetween according to the direction in which the pinions 8, etc., are bodily moved in company with the gear casing 11.

The up and down framing adjustment of the film with reference to the framed openings 33, 34 is accomplished without disturbing the relation of the intermittently actuating gearing 26, 27 with respect to the prime spur gear 18 and, if desired, the travel of the film between the aprons may be continued while the framing adjustment of the film is in progress. The framing adjustment of the film may also be effected without disturbing the relation of the intermittently actuating gearing 26, 27 with the intermittently operated pinions 8 which should be the case if the framing adjustment is accomplished while the normal intermittently effected travel of the film is in progress. Where the relation of the pinions 8 and the gearing 26, 27 is maintained these pinions themselves act as a medium through which the swingingly adjusted casing 11 serves to move the film up or down in effecting its adjustment. I do not wish to be limited, however, to the employment of the pinions 8 as the means whereby the adjusted casing 11 effects the adjustment of the film nor do I wish to be limited to the employment of an adjustably mounted casing for the purpose of effecting the framing adjustment of the film. Where the pinions 8 coöperate with the casing 11 in effecting the framing adjustment of the film the apron 30 is continued downwardly and is curved to be concentric with the rod 37 so that as the pinion 8 is swung with the casing 11 the same space between it and the apron 30 will be maintained. The curved lower continuation of this apron is closely approached to the pinions 8 having grooves $30^1$ that receive the teeth of the pinions and portions $30^2$ margining the grooves $30^1$ and engaging the untoothed parts of the pinions 8 that are adjacent the teeth of these pinions. The parts $30^2$ of the apron 30 engage the film and hold it in mesh with the pinions 8, a condition which is true in all of the positions to which the casing 11 is adjusted since the parts $30^2$ that engage the film adjacent the teeth of the pinions 8 are curved to be co-axial with the rod 37 wherefore these portions $30^2$ conform to the arc of swinging movement of the portions of the pinions 8 that are nearest the said parts $30^2$. By the apparatus illustrated the film is adjustable with respect to the gearing 18, 23, 24, 25, 26 and 27 that effects the step by step rotation of the pinions 8, this being the result that must be accomplished in the framing adjustment where the apparatus is employed to project the pictures upon a screen, an important advantage of the construction of my present invention residing in the fact that this adjustment of the film may be effected up or down in the guide 1 as desired.

The precise form of the aprons that constitute the guide is not material to my present invention but that illustrated is preferred.

Referring particularly to Figs. 5 and 9, the apron 30 carries screws 47 that project through the hinged mounting 48 that is assembled by means of the pintle 31 with the frame 32 of the apparatus. Bow-springs 49 have their ends incircling the screws 47 and serve to press the apron 30 toward the apron 29 as far as the nuts upon the screw 47 would permit, the aprons 29 and 30 being spaced far enough apart to permit of the free passage of the film 2 therebetween. The tension of the bow springs is adjusted by the adjusting devices 50. If there are any unusual enlargements upon the film the bow springs will yield to permit of the passage thereof between the aprons.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

Picture projection apparatus including a picture bearing film; a lens structure; a guide for directing the film to the lens structure; a pinion structure in mesh with the film for causing travel of the film at said guide and lens structure and mounted to swing bodily in the line of travel of the film; and operating gearing for effecting the step by step operating movement of said pinion structure, said guide structure having a continuation engaging the film adjacent the teeth of the pinion structure and curved to conform to the arc of swinging movement of the pinion structure.

In witness whereof, I hereunto subscribe my name this eighth day of October, A. D. 1917.

ALBERT B. MUELLER